US009235224B2

United States Patent
Lau

(10) Patent No.: US 9,235,224 B2
(45) Date of Patent: Jan. 12, 2016

(54) DEVICE FOR REGULATING VOLTAGE

(71) Applicant: MINWA ENERGY AUTO SWITCH TECHNOLOGY COMPANY LIMITED, Admiralty (HK)

(72) Inventor: Hak Wah Lau, Admiralty (HK)

(73) Assignee: MINWA ENERGY AUTO SWITCH TECHNOLOGY COMPANY LIMITED, Admiralty (HK)

( * ) Notice: Subject to any disclaimer, the term of this patent is extended or adjusted under 35 U.S.C. 154(b) by 121 days.

(21) Appl. No.: 13/959,763

(22) Filed: Aug. 6, 2013

(65) Prior Publication Data

US 2014/0042996 A1    Feb. 13, 2014

(30) Foreign Application Priority Data

Aug. 10, 2012   (HK) .................................. 12107884.0

(51) Int. Cl.
  *G05F 1/46*    (2006.01)
  *H02M 3/156*    (2006.01)

(52) U.S. Cl.
  CPC .............. *G05F 1/462* (2013.01); *H02M 3/156* (2013.01); *H02M 2003/1566* (2013.01)

(58) Field of Classification Search
  CPC ............ G05F 1/46; G05F 1/462; H02M 3/00; H02M 3/02; H02M 3/04; H02M 3/156; H02M 2003/1566
  USPC .......... 713/300; 323/234, 265, 273, 274, 275, 323/282, 283, 284, 285
  See application file for complete search history.

(56) References Cited

U.S. PATENT DOCUMENTS

| | | | |
|---|---|---|---|
| 6,861,824 B1* | 3/2005 | Liu et al. ........................ | 320/164 |
| 8,248,035 B2 | 8/2012 | Kung | |
| 2004/0001346 A1* | 1/2004 | McDowell et al. .............. | 363/89 |
| 2008/0218140 A1* | 9/2008 | Liao et al. ...................... | 323/282 |
| 2008/0272741 A1* | 11/2008 | Kanamori ...................... | 320/137 |
| 2010/0060233 A1* | 3/2010 | Kung et al. .................... | 320/107 |
| 2010/0064148 A1* | 3/2010 | Ho et al. ........................ | 713/300 |

FOREIGN PATENT DOCUMENTS

| | | |
|---|---|---|
| CN | 201477513 U | 5/2010 |
| CN | 201674412 U | 12/2010 |
| CN | 102201747 | 9/2011 |
| CN | 202013552 U | 10/2011 |

* cited by examiner

*Primary Examiner* — Jeffrey Gblende
(74) *Attorney, Agent, or Firm* — Mark M. Friedman

(57) ABSTRACT

A voltage regulating device includes a power supply adapter, a voltage and current signal processing module, a control module, and a voltage regulating module. The power supply adapter supplies voltage to an electronic device. The voltage and current signal processing module detects the current and voltage supplied by the power supply adapter, and calculated the desired voltage adapted for the electronic device according to the detected current and voltage and a preset voltage for the electronic device. The control module generates a control signal according to the calculated desired voltage. The voltage regulating module regulates the voltage supplied by the power supply adapter according to the control signal, to cause the voltage supplied by the power supply adapter to adapt for the electronic device. As a result, the voltage regulating device can regulate the voltage supplied by the power supply adapter to adapt for the electronic device, which can be used conveniently.

9 Claims, 4 Drawing Sheets

DEVICE FOR REGULATING VOLTAGE

BACKGROUND

1. Technical Field

The present disclosure relates to voltage regulating devices, and more particularly to a voltage regulating device for regulating voltage supplied by power supply equipment.

2. Description of Related Art

External power sources are frequently needed to provide power to electronic devices, such as panel computers, mobile phones, notebook computers, or the like. Usually, each kind of digital products is equipped with a special adapter for supplying a predetermined voltage. However, the voltages supplied by various adapters are generally different, thus when the electronic device is powered for a long time by an unequipped adapter, the life of the electronic device may be lessen, even more serious, the electronic device may be burned. In the market, some adapter capable of regulating voltage is provided, but there are a lot of obvious shortcomings to employ the adapter for supplying voltage, for example, unsafely and badly using.

Therefore, there is a perspective for improvement in the art.

SUMMARY

Embodiments of the present invention relate to a voltage regulating device.

An embodiment of the voltage regulating device includes a power supply adapter, a voltage and current signal processing module, a control module, and a voltage regulating module. The power supply adapter is used to supply voltage to an electronic device. The voltage and current signal processing module detects the current and voltage supplied by the power supply adapter, and calculated the desired voltage adapted for the electronic device according to the detected current and voltage supplied by the power supply adapter and a preset voltage for the electronic device. The control module generates a control signal according to the desired voltage calculated by the voltage and current signal processing module. The voltage regulating module regulates the voltage supplied by the power supply adapter according to the control signal, to cause the voltage supplied by the power supply adapter to adapt for the electronic device.

Wherein, the voltage regulating device comprises a manual operable module, the manual operable module is used to control the voltage regulating module in response to users' operation, thereby user are allowed to manually a control the voltage regulating voltage.

Wherein, the voltage regulating device comprises at least one sensor, the at least one sensor is electrically connected to the control module and is used to detect different environmental parameters of the voltage regulating device.

Wherein, the at lest one sensor may be, but not limited to, sound sensors, light sensors, humidity sensors, temperature sensors.

Wherein the voltage regulating device comprises a USB adapter having a USB port and a USB voltage detecting and regulating module, the USB port is used to connect the USB adapter to the electronic device, to allow the USB adapter to supply voltage to the electronic device, the USB voltage detecting and regulating module detects the voltage between an anode terminal D+ and a cathode terminal D− of the USB port; wherein the control module further determines whether the voltage detected by the USB detecting and regulating module matches the preset voltage for the electronic device, when the voltage detected by the USB detecting and regulating module does not match with the preset voltage of the electronic device, the control module further controls the USB detecting and regulating module to regulate the voltage supplied by the USB adapter to regulate the voltage between the anode terminal D+ and the cathode terminal D− of the USB port.

Wherein, the USB voltage detecting and regulating module comprises an identifying unit and an USB voltage regulating unit, the identifying unit is used to identify the ID code of the electronic device, and further transmits the identified ID to the control module; the control module determines one second rule corresponding to the received ID and send the obtained preset second rule as a feedback to the USB voltage regulating unit, and the USB voltage regulating unit regulates voltage supplied by the USB adapter in response to the feedback.

Wherein, the control module determines one regulating rule corresponding to the received ID, and further controls the voltage regulating module to regulate voltage supplied by the power supply adapter, to adapt for the electronic device.

In the present invention, the voltage regulating device detects the current and voltage supplied by the power supply adapter, and calculate the desired voltage adapted for the electronic device according to the detected current and voltage supplied by the power supply adapter and a preset voltage, and further regulates the voltage supplied by the power supply adapter according to the calculated desired voltage, to cause the voltage supplied by the power supply adapter to adapt for the electronic device, which can be used conveniently.

The following detailed description, together with the accompanying drawings will provide a better understanding of the nature and advantages of the present invention.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts through out the several views.

DETAILED DESCRIPTION

The disclosure is illustrated by way of example and not by way of limitation in the figures of the accompanying drawings in which like reference indicate similar elements. It should be noted that reference to "an" or "one" embodiment in the disclosure are not necessarily to the same embodiment, and such references mean "at least one".

Figure 1:
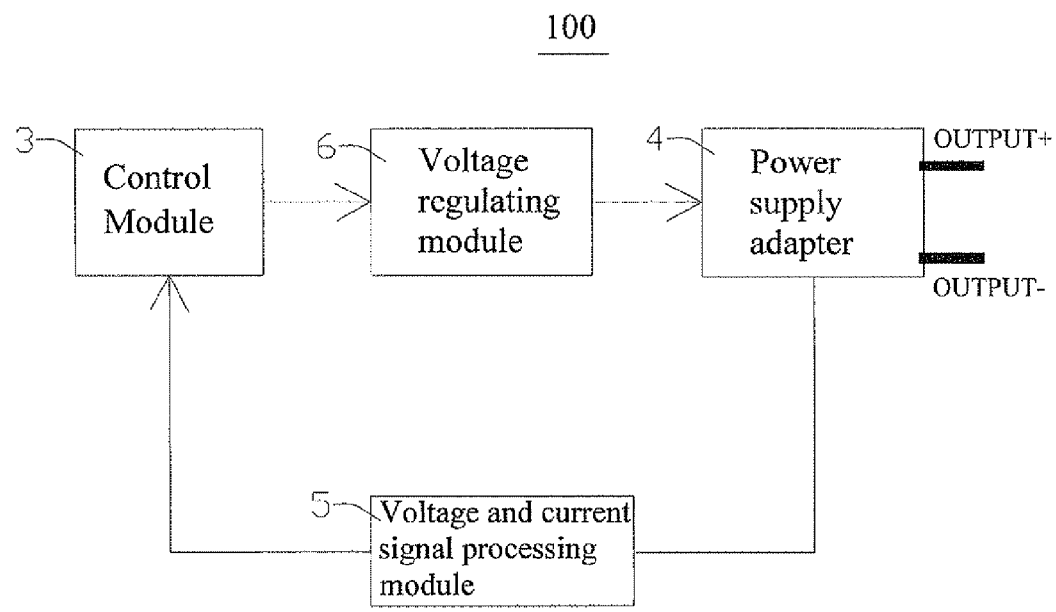
FIG. 1 is a block diagram of a voltage regulating device in accordance with a first embodiment.

FIG. 1 illustrates a block diagram of a voltage regulating device 100 in accordance with an embodiment. The voltage regulating device 100 includes a power supply adapter 4 for supplying voltage to an electronic device (not shown), such as a notebook computer for example. The voltage regulating device 100 can regulate supply voltage of the power supply adapter 4, to cause the supplied voltage to adapt the electronic device. The voltage regulating device 100 further includes a control module 3, a voltage and current signal processing module 5, and a voltage regulating module 6 for regulating the supply voltage of the power supply adapter 4.

The power supply adapter 4 includes an OUTPUT+ terminal and an OUTPUT− terminal. The power supply adapter 4 is electrically connected to the electronic device, and supplies power to the electronic device by the OUTPUT+ terminal and an OUTPUT− terminal. When the power supply adapter 4 is electrically connected to the electronic device, the voltage and current signal processing module 5 detects the current and voltage supplied by the power supply adapter 4, and calculates the desired voltage adapted for the electronic device according to the detected current and voltage supplied by the power supply adapter 4 and a preset voltage. The control module 3 generates a control signal according to the desired voltage calculated by the voltage and current signal processing module 5. The voltage regulating module 6 regulate the voltage supplied by the power supply adapter 4 according to the control signal, to cause the voltage supplied by the power supply adapter 4 to adapt for the electronic device.

Figure 2:
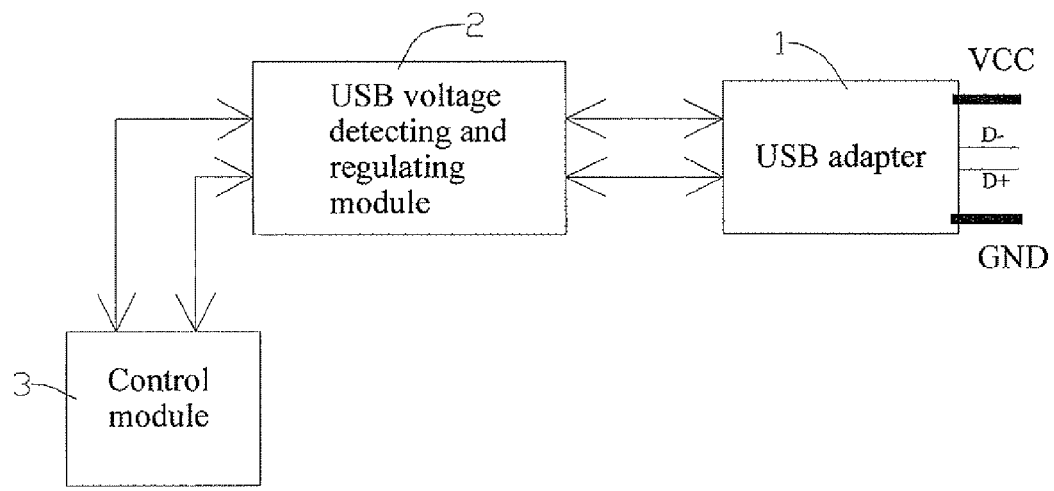
FIG. 2 is a block diagram of a voltage regulating device in accordance with a second embodiment.
Figure 3:
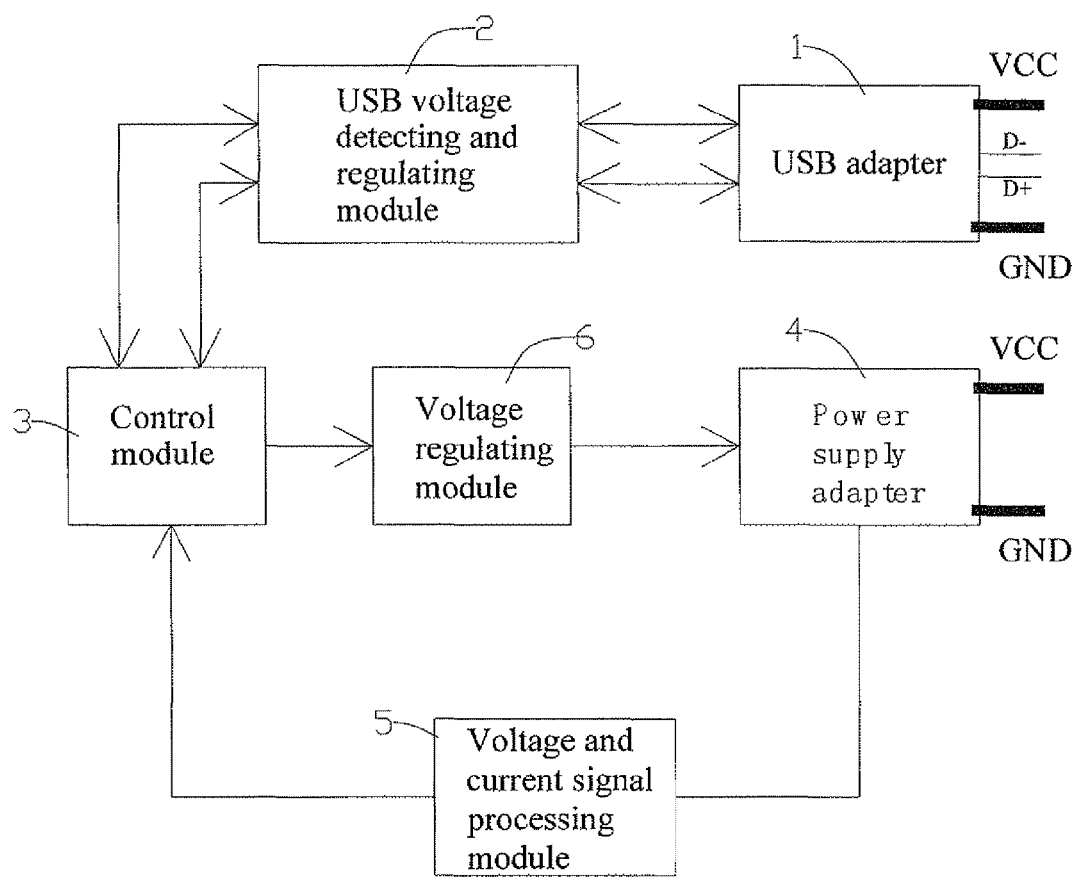
FIG. 3 is a detailed block diagram of the voltage regulating device of FIG. 1.

Referring to FIG. 2, the voltage regulating device 100 further includes a USB adapter 1 and a USB voltage detecting and regulating module 2. The USB adapter 1 includes a USB port used to connect the USB adapter to the electronic device, thus the USB adapter 1 can supply voltage to the electronic device. The USB voltage detecting and regulating module 2 detects the voltage between an anode terminal D+ and a cathode terminal D− of the USB port. The USB port generally includes an USB power supply VCC, the anode terminal D+ and the cathode terminal D− of the bus of the USB port, and a grounded terminal GND. The control module 3 determines whether the voltage detected by the USB detecting and regulating module 2 matches the preset voltage of the electronic device. When the voltage detected by the USB detecting and regulating module 2 does not match with the preset voltage of the electronic device, the control module 3 controls the USB detecting and regulating module 2 to regulate the voltage supplied by the USB adapter 1, that is, to regulate the voltage between the anode terminal D+ and the cathode terminal D− of the USB port.

The voltage regulating device 100 further includes a manual operable module 7. The manual operable module 7 is used to control the voltage regulating module 6 in response to users' operation, thereby user are allowed to manually and conveniently control the voltage regulating voltage 6 according to users' experience.

The voltage regulating device 100 further includes a number of sensors 8. The sensors 8 may be, but not limited to, sound sensors, light sensors, humidity sensors, temperature sensors, or may be any two or more of above mentioned sensors in combination. The sensors 8 are electrically connected to the control module 3 and are used to detect different environmental parameters of the voltage regulating device 100. It is understood that, the control module 3 stores a number of preset first regulating rules each used to regulate the voltage supplied by the power supply adapter 4 or the USB adapter 1. Different first preset regulating rules correspond to different environmental parameters. For example, when the voltage regulating device 100 determines that it is in the night according to the environmental parameters, the voltage regulating device 100 determines that a power saving mode is required, and correspondingly regulates the voltage supplied by the power supply adapter 4 or the USB adapter 1 to save power.

Figure 4:
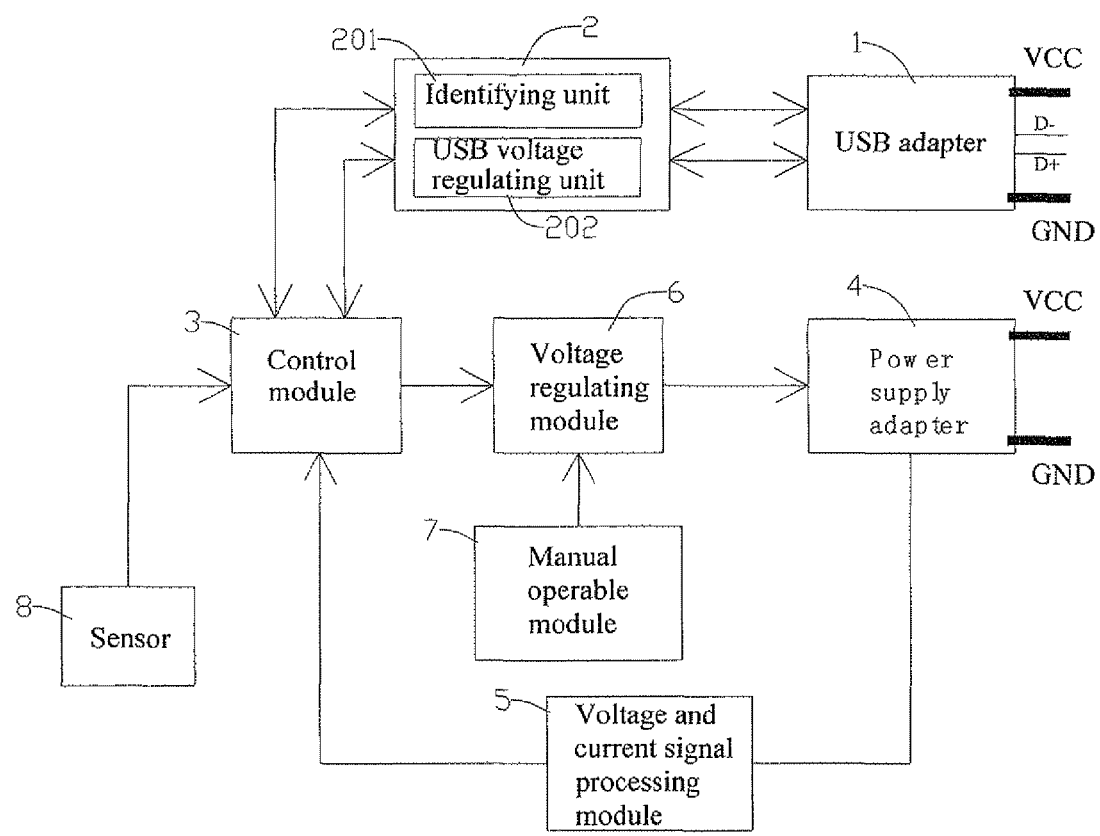
FIG. 4 is a detailed block diagram of the voltage regulating device of FIG. 3.
Figure 5:
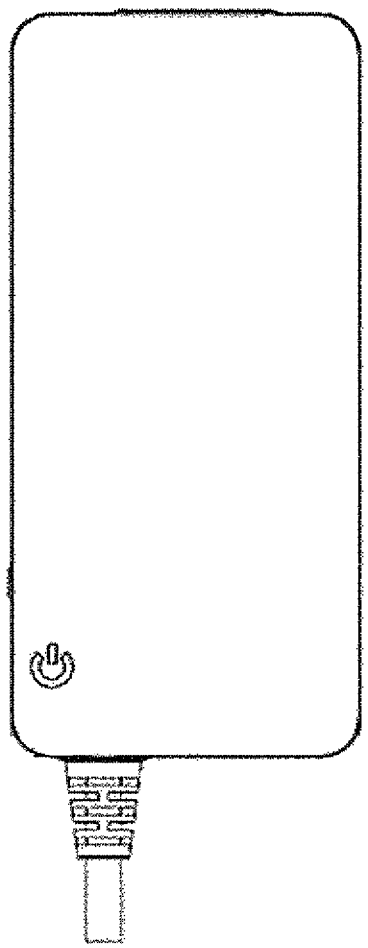
FIG. 5 is a schematic view of the voltage regulating device of FIG 1.

The voltage regulating device 100 can communicate with electronic devices having identification (ID) code. The control module 3 records a number of preset second regulating rules each corresponding to a type of electronic devices. Referring to FIG. 4, the USB voltage detecting and regulating module 2 includes an identifying unit 201 and an USB voltage regulating unit 202. The identifying unit 201 is used to identify the ID code of the electronic device connected to the voltage regulating device 100, and transmits the identified ID to the control module 3. When receives ID code, the control module 3 determines one second rule corresponding to the received ID and send the obtained preset second rule as a feedback to the USB voltage regulating unit 202. The USB voltage regulating unit 202 regulates voltage supplied by the USB adapter 1 in response to the feedback of the control module 3. In additional, the above mentioned second regulating rules can also be applied to regulate voltage supplied by the power supply adapter 4, whereby the voltage supplied by the power supply adapter 4 is adapted for the electronic device.

Although information as to, and advantages of, the present embodiments have been set forth in the foregoing description, together with details of the structures and functions of the present embodiments, the disclosure is illustrative only; and changes may be made in detail, especially in the matters of Shape, size, and arrangement of parts within the principles of the present embodiments to the full extent indicated by the broad general meaning of the terms in which the appended claims are expressed.

What is claimed is:

1. A device for regulating voltage, comprising:
a power supply adapter to supply voltage to an electronic device;
a voltage and current signal processing module to detect a current and voltage supplied by the power supply adapter, and to calculate a desired voltage adapted for the electronic device according to the detected current and voltage supplied by the power supply adapter and a preset voltage for the electronic device;
a control module to generate a control signal according to the desired voltage calculated by the voltage and current signal processing module;
a voltage regulating module to regulate the voltage supplied by the power supply adapter according to the control signal, to cause the voltage supplied by the power supply adapter to adapt for the electronic device;
a manual operable module for controlling the voltage regulating module in response to a users' operation, thereby the users' are allowed to manually control the voltage regulating module; and
at least one sensor which is electrically connected to the control module and is used to detect different environmental the device; wherein the at least ones sensor may be, but not limited to, sound sensors, light sensors, humidity sensors, or temperature sensors;
wherein the device further comprises a USB adapter having a USB port and a USB voltage detecting and regulating module, wherein the USB port is used to connect the USB adapter to the electronic device, to allow the USB adapter to supply voltage to the electronic device, the USB voltage detecting and regulating module detects a voltage between an anode terminal D+ and a cathode terminal D− of the USB port;

wherein the control module further determines whether the voltage detected by the USB detecting and regulating module matches the preset voltage for the electronic device, when the voltage detected by the USB detecting and regulating module does not match with the preset voltage of the electronic device, the control module further controls the USB detecting and regulating module to regulate the voltage supplied by the USB adapter to regulate the voltage between the anode terminal D+ and the cathode terminal D− of the USB port.

2. The device for regulating voltage of claim 1, wherein the USB voltage detecting and regulating module comprises an identifying unit and an USB voltage regulating unit, the identifying unit is used to identify an ID code of the electronic device, and further transmits the identified ID to the control module; the control module determines one second rule corresponding to a received ID and sends an obtained preset second rule as a feedback to the USB voltage regulating unit, and the USB voltage regulating unit regulates voltage supplied by the USB adapter in response to the feedback.

3. The device for regulating voltage of claim 2, wherein the control module determines one regulating rule corresponding to the received ID, and further controls the voltage regulating module to regulate voltage supplied by the power supply adapter, to adapt for the electronic device.

4. A device for regulating voltage, comprising:
a power supply adapter to supply voltage to an electronic device;
a voltage and current signal processing module to detect a current and voltage supplied by the power supply adapter, and to calculate a desired voltage adapted for the electronic device according to the detected current and voltage supplied by the power supply adapter and a preset voltage for the electronic device;
a control module to generate a control signal according to the desired voltage calculated by the voltage and current signal processing module; and
a voltage regulating module to regulate the voltage supplied by the power supply adapter according to the control signal, to cause the voltage supplied by the power supply adapter to adapt for the electronic device;
the device further comprises a USB adapter having a USB port and a USB voltage detecting and regulating module, wherein the USB port is used to connect the USB adapter to the electronic device, to allow the USB adapter to supply voltage to the electronic device, the USB voltage detecting and regulating module detects a voltage between an anode terminal D+ and a cathode terminal D− of the USB port;
wherein the control module further determines whether the voltage detected by the USB detecting and regulating module matches the preset voltage for the electronic device, when the voltage detected by the USB detecting and regulating module does not match with the preset voltage of the electronic device, the control module further controls the USB detecting and regulating module to regulate the voltage supplied by the USB adapter to regulate the voltage between the anode terminal D+ and the cathode terminal D− of the USB port.

5. The device for regulating voltage of claim 4, wherein the USB voltage detecting and regulating module comprises an identifying unit and an USB voltage regulating unit, the identifying unit is used to identify an ID code of the electronic device, and further transmits the identified ID to the control module; the control module determines one second rule corresponding to a received ID and sends an obtained preset second rule as a feedback to the USB voltage regulating unit, and the USB voltage regulating unit regulates voltage supplied by the USB adapter in response to the feedback.

6. The device for regulating voltage of claim 5, wherein the control module determines one regulating rule corresponding to the received ID, and further controls the voltage regulating module to regulate voltage supplied by the power supply adapter, to adapt for the electronic device.

7. The device for regulating voltage of claim 4, further comprising a manual operable module, wherein the manual operable module is used to control the voltage regulating module in response to a users' operation, thereby the users' are allowed to manually control the voltage regulating module.

8. The device for regulating voltage of claim 4, further comprising at least one sensor, wherein the at least one sensor is electrically connected to the control module and is used to detect different environmental parameters of the device.

9. The device for regulating voltage of claim 8, wherein the at least one sensor may be, but not limited to, sound sensors, light sensors, humidity sensors, or temperature sensors.

* * * * *

UNITED STATES PATENT AND TRADEMARK OFFICE
CERTIFICATE OF CORRECTION

PATENT NO. : 9,235,224 B2  
APPLICATION NO. : 13/959763  
DATED : January 12, 2016  
INVENTOR(S) : Hak Wah Lau Page 1 of 1

It is certified that error appears in the above-identified patent and that said Letters Patent is hereby corrected as shown below:

In the claims:

Claim 1 column 4 line 57 should be corrected at follows:
delete "environmental the device"
insert --environmental parameters of the device--

Signed and Sealed this
Twelfth Day of April, 2016

Michelle K. Lee
*Director of the United States Patent and Trademark Office*